Sept. 29, 1970          C. B. PERRY          3,530,571

MANUFACTURING SYSTEM

Filed Dec. 15, 1967          5 Sheets-Sheet 3

United States Patent Office 3,530,571
Patented Sept. 29, 1970

3,530,571
MANUFACTURING SYSTEM
Charles B. Perry, Cincinnati, Ohio, assignor to Cincinnati Milacron, Inc., Cincinnati, Ohio, a corporation of Ohio
Filed Dec. 15, 1967, Ser. No. 691,027
Int. Cl. B23q 41/02
U.S. Cl. 29—563
13 Claims

ABSTRACT OF THE DISCLOSURE

This invention relates to a manufacturing system and, more particularly, to an arrangement of work stations and associated equipment for performing a series of operations on each of a plurality of workpieces in which the workpieces are moved individually along a conveyor capable of individually addressing workpieces to work stations such as machine tools, inspection stations, assembly and processing stations, for example.

BACKGROUND OF THE INVENTION

In the manufacture of parts by machining process, it has been suggested that the workpieces be moved by conveyor to the work stations for the required operations. Each of the work stations provided by machine tools represents a considerable capital investment, however, and it is, therefore, important that each machine be used at its greatest capability in order that the invested capital is not allowed to be idle. This is particularly true in the case of the machine tool which is of the multiple-function, numerically-controlled type exemplified by turret drills, tool changers, milling machines and the like. Automatic work load equalization is a goal to be realized. Automatic functioning of the systems is sought with only part loading and unloading personnel being required. In the past, attempts to provide machining systems of this type have resulted in large queues of workpieces accumulating at particular machines, while other machine tools stand idle. These and other difficulties experienced with the prior art devices have been obviated in a novel manner by the present invention.

It is, therefore, an object of the present invention to provide a manufacturing system in which provision is made for using most effectively a plurality of work stations as provided, for example, by machine tools arranged to permit workpiece interchange to occur in a minimum of non-productive time.

Another object of this invention is the provision of a manufacturing system including a plurality of work stations, each station being used at its greatest efficiency by virtue of advanced delivery of the next workpiece to a queue prior to completion of processing operations of the previous workpiece thereby permitting continuous processing interrupted only by short workpiece interchange time.

It is another object of the instant invention to provide a manufacturing system in which workpieces having address apparatus are moved on a conveying system along a plurality of machine tools, wherein address readers are located in the system, which readers not only determine the path in which the workpieces move to the machine tools, but also cause them to move to alternate machine tools when a machine tool is not available.

A still further object of the invention is the provision of a manufacturing system having the advantage of flexibility presently enjoyed in job shop operations and single numerically-controlled machines in conjunction with high production rates now found in linked special machines and transfer line machines.

It is a further object of the invention to provide a manufacturing system which achieves the high production rates of linked special machine tools without involving the large capital investment of special inflexible equipment.

It is a still further object of the present invention to provide a manufacturing system incorporating numerically-controlled machine tools having flexibility of part production, while permitting high production rates.

Another object of the invention is the provision of a manufacturing system using a number of machining centers in which balanced operations are performed at each center or station.

Another object of the invention is the provision of a manufacturing system in which a changeover from a run of a certain type of workpieces to a run of another type of workpieces can take place without the necessity of more than one machine tool being idle at any given time during the changeover.

Another object of the invention is the provision of a manufacturing system in which more than one type of part may be concurrently manufactured. Introduction of a run of different new parts can occur as the final workpieces of a previous run of parts are moved to various machine tools or are being completed in the system.

Another object of the invention is the provision of a manufacturing system in which the shutdown or malfunction of a particular machine tool does not necessitate the inoperativeness of the other machine tools in the system.

Another object of the invention is the provision of a manufacturing system that is readily expandable in predetermined steps without loss of components from a simple, inexpensive layout to a relatively large and more elaborate layout. Such expansion can include addition of addressed load and unload stations, part inspection stations, process stations, tool change modules and the like.

Another object of the invention is the provision of a manufacturing system in which the operations to be performed on a given workpiece may be divided into dependent and non-dependent station addresses. Dependent station addresses are those in which workpieces must proceed station to station in a predetermined sequence. Non-dependent addresses are used when work performed in a station is not dependent on prior or subsequent operations. This invention permits use of a plurality of dependent series and non-dependent addresses. The present address system affords a means of controlling the sequence of dependent operations when such control is required and permitting non-dependent address operation when there is no requirement of control of prior and post operation sequencing.

Another object of this invention is to provide a means whereby workpieces will automatically bypass an addressed station if excessive work in queue exists and will seek the first available coincidence address with an acceptable queue line. Thus automatic work load leveling at machines is achieved.

A further object of this invention is to provide a means whereby the address identity of a work station may be quickly and readily changed thus permitting workpiece changeover to be accomplished without disruption of system operation. One way of accomplishing this is to provide a movable sensor means readily insertable into predetermined locations representing station identities.

With these and other objects in view, as will be apparent to those skilled in the art, the invention resides in the combination of parts set forth in the specification and covered by the claims appended hereto.

SUMMARY OF THE INVENTION

In general, features included in the objects of the present invention may be provided in a manufacturing system having a loop conveyor with a plurality of cross conveyors extending across the loop, a turntable located at each intersection of a cross conveyor with the loop conveyor, and at least one work station located beside at least one side of each cross conveyor. Thus duplex stations or fixed sequence stations may be used on each cross conveyor. Workpieces are adapted to travel along the conveyors, the workpiece having an address means; a first address reader is located at each entrance intersection of a cross conveyor with the loop conveyor and optionally a work-in-queue detector or second address reader is located along each cross conveyor adjacent its work station. Means is operated by the first address reader to cause each workpiece to either enter the cross conveyor or to continue further along the loop conveyor. The work-in-queue detector or second address reader causes the bypassing of a work station to another work station with a shorter work-in-process queue to perform a preselected operation on the workpiece.

More specifically, one of the cross conveyors is associated with at least one machine tool programmable to perform a series of dependent or non-dependent operations on the workpiece. The first address reader is associated with one of the cross conveyors and permits the workpiece to enter that conveyor if address coincidence is present and less than a predetermined queue of workpieces is present to accept the added workpiece.

BRIEF DESCRIPTION OF THE DRAWINGS

The character of the invention, however, may be best understood by reference to one of its structural forms, as illustrated by the accompanying drawings, in which:

FIG. 9 is a vertical sectional view of a portion of the system taken on the line IX—IX of FIG. 1, FIG. 10 is a vertical sectional view taken on the line X—X of FIG. 9, FIG. 11 is a vertical sectional view of the system taken on the line XI—XI of FIG. 1, FIGS. 12 and 13 are vertical sectional views taken on the lines XII—XII and XIII—XIII of FIG. 11.

DESCRIPTION OF AN EMBODIMENT OF THIS INVENTION

Figure 1:
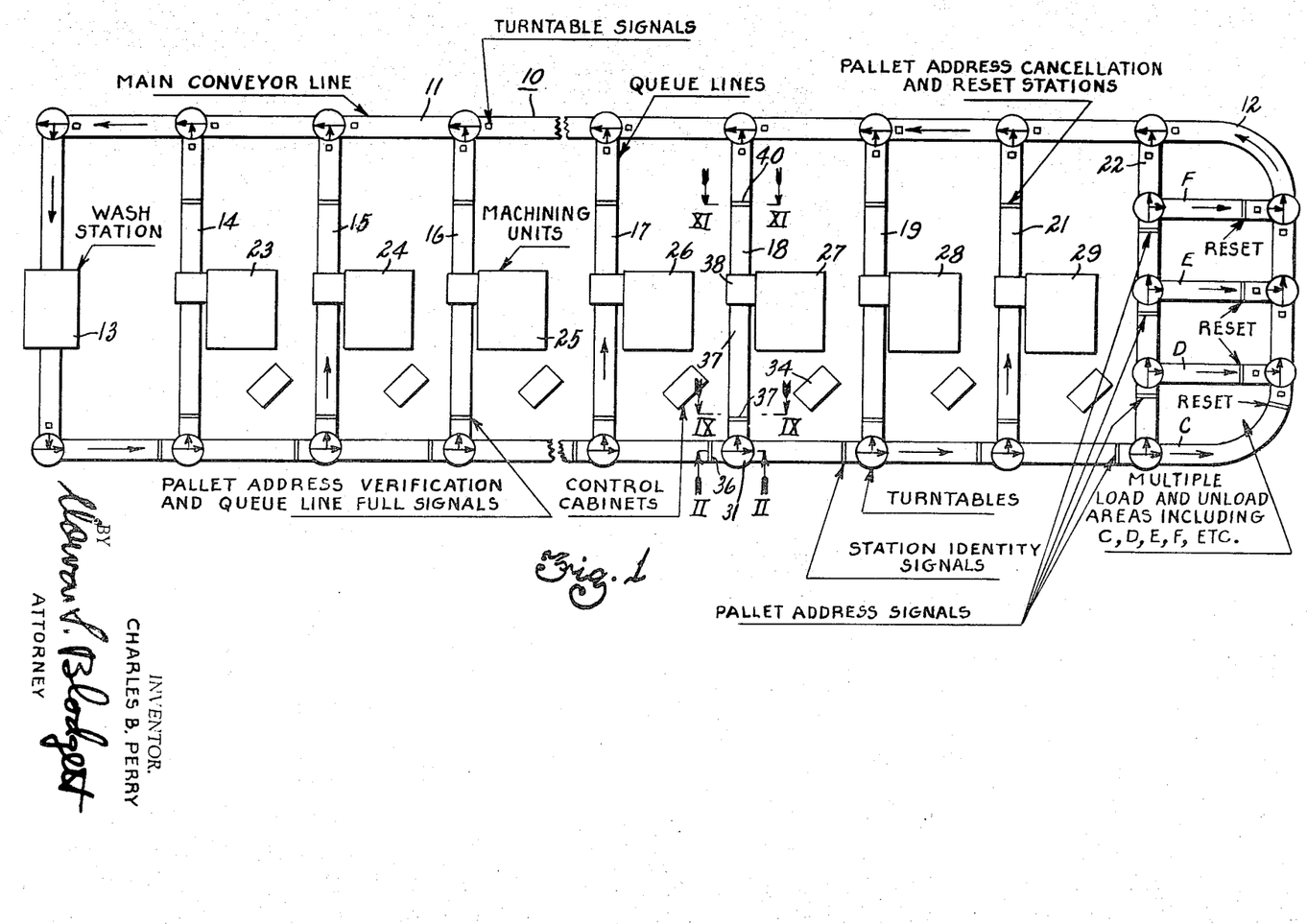
FIG. 1 is a diagrammatic representation in plan view of a manufacturing system embodying the principles of the present invention.

Referring first to FIG. 1, wherein are best shown the general features of the invention, a manufacturing system, indicated generally by the reference numeral 10, is shown as including a loop conveyor 11 having a load-and-unload station 12 at one end and a wash station 13 at the other end. Extending across the loop are a plurality of cross conveyors 14, 15, 16, 17, 18, 19, and 21. Beside the intermediate portions of each of these cross conveyors is a work station, i.e., a work station 23 associated with the cross conveyor 14, a work station 24 with the cross conveyor 15, a work station 25 with the cross conveyor 16, a work station 26 with the cross conveyor 17, a work station 27 with the cross conveyor 18, a work station 28 with its cross conveyor 19, and a work station 29 with the cross conveyor 21. A cross conveyor 22 is located adjacent the load-and-unload station 12 and is not associated with a particular work station; in other words, it acts as a by-pass across the loop conveyor to avoid passing through the load-and-unload station 12. At each intersection of a cross conveyor with the loop conveyor is provided a switching means, such as a turnstile, for instance, at the entrance to the cross conveyor 18 a turnstile 31 joins the straight side of the loop conveyor to the cross conveyor.

The conveyors are constructed to permit a workpiece 32 mounted on a fixture equipped with an address device and registration device or pallet 33 so equipped (see FIG. 2) to be moved automatically through the system; the propulsion takes place by driving rollers in the conveyors which engage suitable surfaces of the fixture or pallet. Each work station is provided with a control means which regulates its operations; for instance, in the case of the work station 27 associated with the cross conveyor 18, the work station is exemplified by an 8-spindle turret machine tool with a numerical control system housed in a cabinet 34. Each fixture or pallet 33 is provided with an address device 35 (see FIG. 2) and an address reader is located immediately in front of each entrance turnstile, and a further address reader or detector is in front of each work station. In the case of the work station 27 and the cross conveyor 18, a first address reader 36 is located on the loop conveyor adjacent the turnstile and a second address reader or detector 37 is located along cross conveyor 18 ahead of the work station 27. Furthermore, an address modifier 40 is located in the cross conveyor 18 between the work station and the exit connection with the loop conveyor.

As is indicated by the arrows in FIG. 1, the pallets can move through the system in counter-clockwise loops and the first address readers observe the address devices on each fixture or pallet in front of each turnstile and cause the fixture or pallet with its workpiece to either enter the cross conveyor or continue straight ahead on the loop conveyor. The second address reader checks the identity of the workpiece. The second address reader or detector is also used to signal condition of queue length. A locating table lies in each cross conveyor beside the work station to locate the pallet and workpiece; for instance, a locating table 38 lies in the cross conveyor 18 and serves to lock the fixture or pallet 33 very accurately relative to the operating spindles and the work axis of the machine tool at the work station 27. The fixture or pallet is located by suitable means, such as the connector shown and described in the patent application of Perry et al., Ser. No. 690,941 filed Dec. 15, 1967 for Manufacturing System. This apparatus comprises circular arrays of complementary projections carried on the fixture or pallet 33 and on the locating table 38 which locate very accurately relative to one another so far as concentricity, angularity, and height are concerned. With the workpiece accurately located relative to the machine tool spindle, the numerical control associated with the machine can cause a series of machining operations to be performed on the workpiece within the limits of tolerance called for. As described in the aforementioned patent application, the connector provides for rigid clamping of the fixture or pallet and workpiece during machining and for indexing of the workpiece for operations on various faces of the workpiece. A connector seal in accordance with disclosure of patent application of Attermeyer, Ser. No. 690,926 filed Dec. 15, 1967, is preferably provided with this apparatus.

Figures 2, 3:
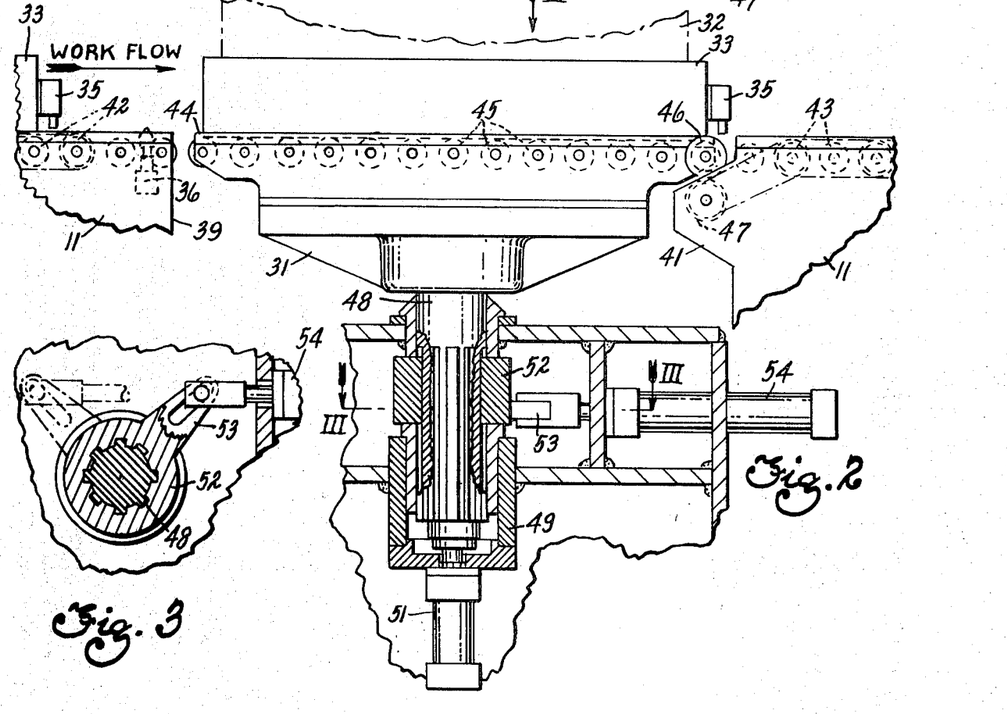
FIG. 2 is a vertical sectional view of a portion of the system taken on the line II—II of FIG. 1.
FIG. 3 is a horizontal sectional view taken on the line III—III of FIG. 2.

FIGS. 2, 3, 4, 5 and 6 show the details of a typical turnstile 31. In FIG. 2, it is shown as located in a gap between a portion 39 of the loop conveyor 11 and a portion 41. The rollers 42 of the portion 39 are driven independently of the rollers 43 of the portion 41. The turnstile 31 is provided with a short section 44 of conveyor having rollers 45 which are driven by engagement of a drive wheel 46 with a roller 47 suitably linked by an inclined flexible belt or chain to rollers 43 of the portion 41 of the loop conveyor. Located at the end of the portion 39 is the first address reader 36.

The turntable 31 is provided with a support shaft 48 which is mounted in a bearing 49 for vertical sliding and rotation relative thereto. A linear actuator such as a cylinder and piston assembly 51 engages the lower end of the shaft to move it up or down. A sleeve 52 is mounted on the shaft in such a manner that the shaft can slide vertically relative thereto, but is keyed by spline-and-groove means against relative rotation. As shown in FIG. 3, the sleeve 52 is provided with a radial arm 53 whose outer end is connected by a pin-and-slot means to the piston rod of an actuating cylinder and piston assembly 54.

Figure 4:
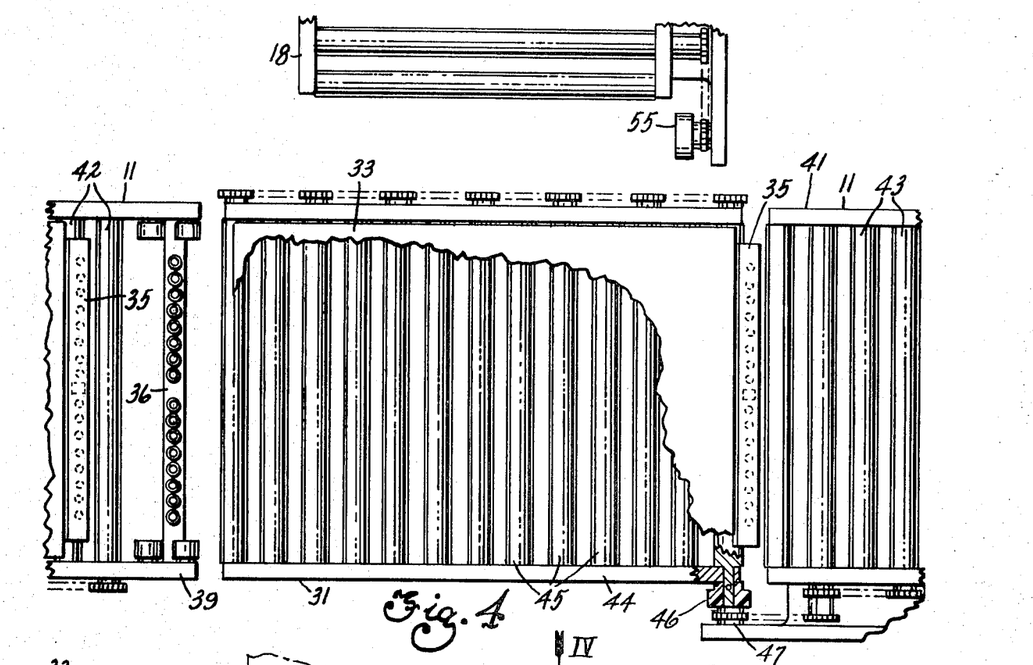
FIG. 4 is a plan view of the apparatus shown in FIG. 2.

FIG. 4 shows other details of the construction of the turnstile 31. For instance, it shows how the drive wheel 46 and the roller 47 are located outboard of the conveyor section 44 and the portion 41. The address device 35 is shown as extending across the width of the fixture or pallet 33, while the first address reader 36 extends across the width of the conveyor portion 39. In this view is shown the adjacent end of the cross conveyor 18 and the manner in which it is also provided with a roller 55 located so as to be engaged by the drive wheel 46 of the turnstile 31 when the turnstile has been rotated 90 degrees about the axis of its shaft 48.

Figure 5:
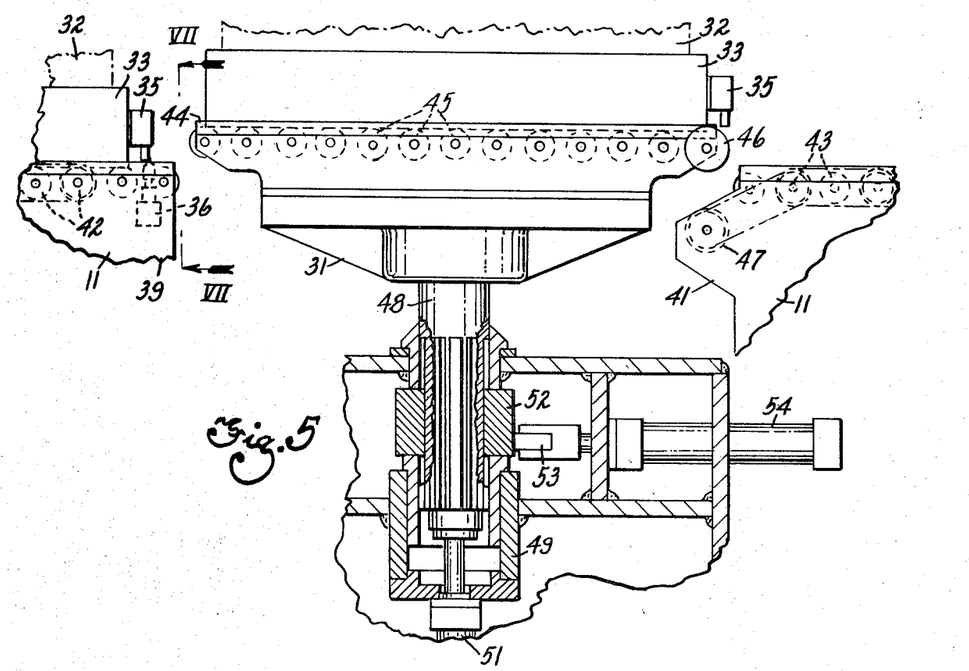
FIG. 5 is a sectional view similar to FIG. 2, but with the parts in a different condition.

FIG. 5 shows the condition of the turnstile 31 after the cylinder and piston assembly 51 has been energized to lift the shaft 48 and the conveyor section vertically a substantial distance. The drive wheel 46 is separated from the roller 47, so that the rollers in the conveyor section 44 are not driven and the pallet 33 with its workpiece 32 remains in a fixed position on the turntable.

Figure 6:
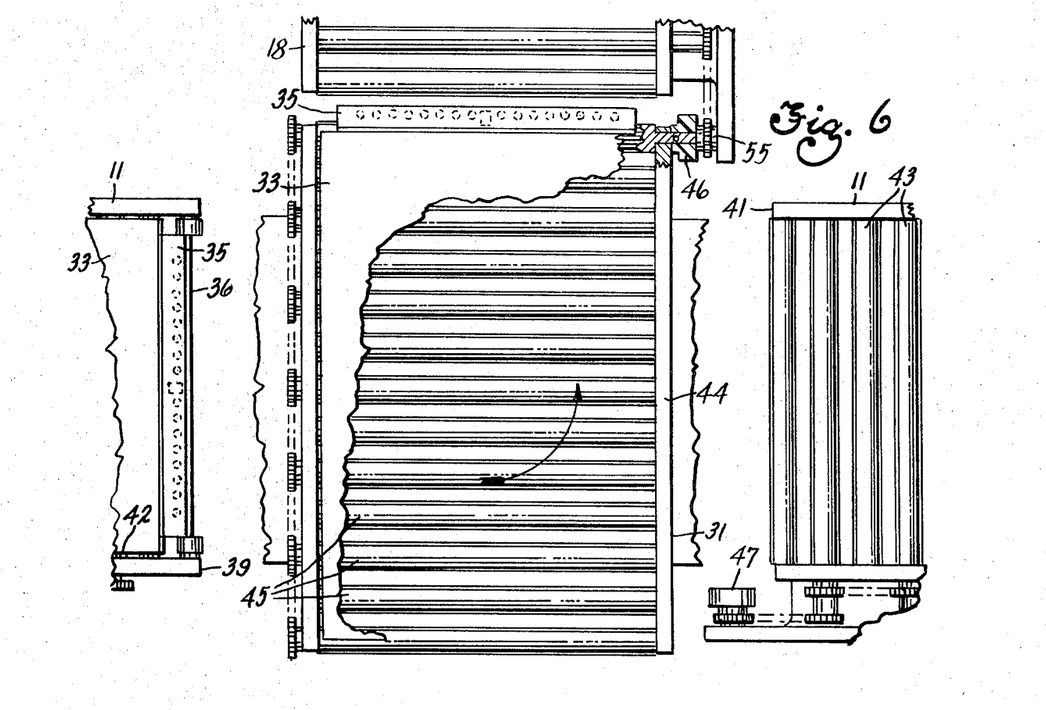
FIG. 6 is a plan view of the apparatus shown in FIG. 5 with the parts in still another condition.

In FIG. 6, the turnstile is shown in a still further condition, after the cylinder and piston assembly 54 has been energized to operate on the arm 53 to rotate the sleeve 52 and, therefore, the shaft 48 and the conveyor section 44 through 90 degrees. The rotation occurs in such a manner to present the leading edge of the fixture or pallet 33 with its address keys toward the receiving end of the conveyor 18 as shown by the arrow. The cylinder and piston assembly 51 is reversed to lower the turnstile and to bring the drive wheel 46 into engagement with roller 55. This drives the rollers of the conveyor section 44 and propels the fixture or pallet and workpiece into the cross conveyor. Automatic return of the turnstile upon discharge of the fixture or pallet is also provided.

Figures 7, 7A, 7B, 8:
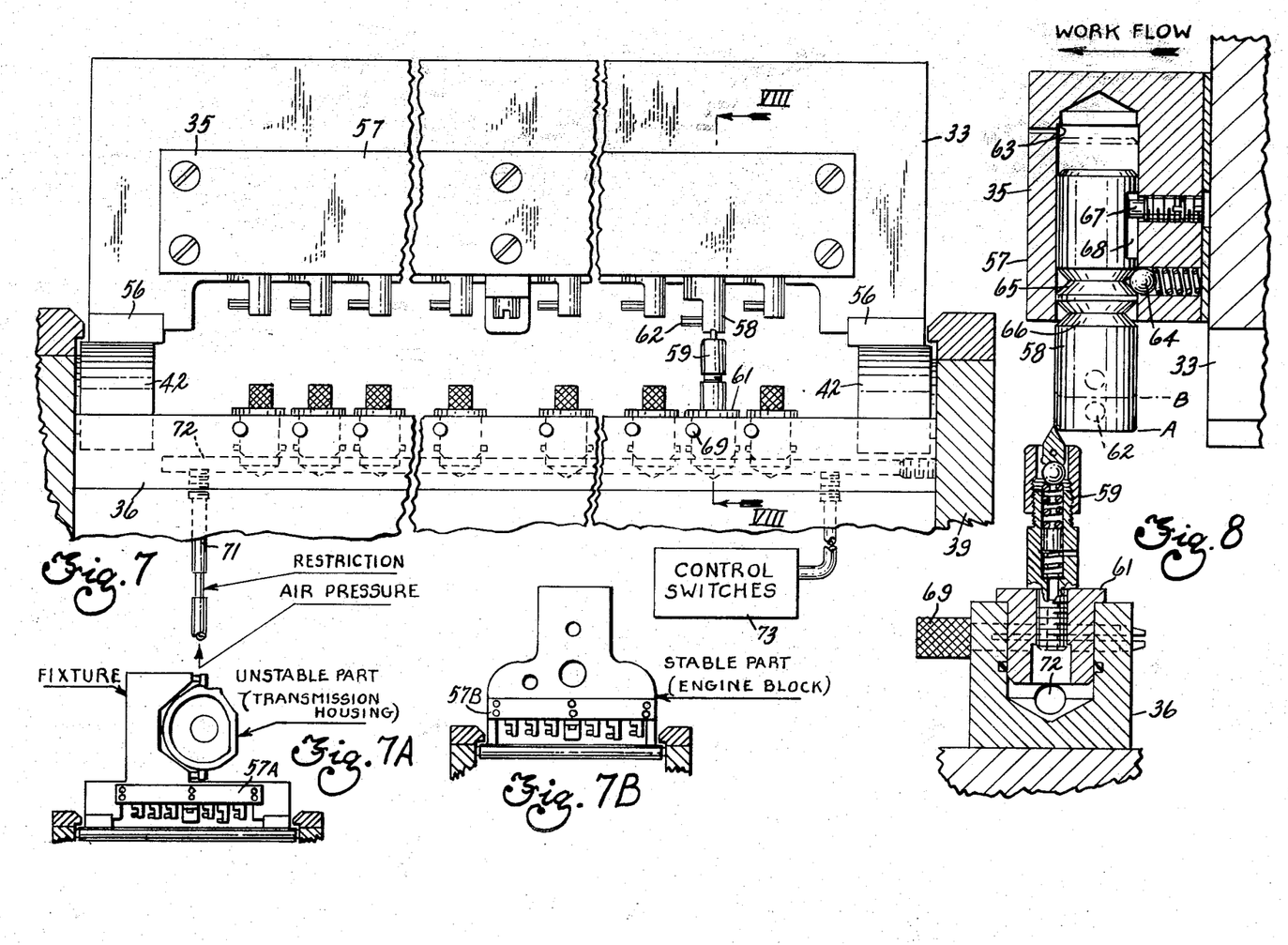
FIG. 7 is a vertical sectional view taken on the line VII—VII of FIG. 5.
FIGS. 7A-7B show modifications of FIG. 7.
FIG. 8 is a vertical sectional view taken on the line VIII—VIII of FIG. 7.

FIG. 7 shows the address device 35 on the front of the fixture or pallet 33 in operative relationship with the first address reader 36 mounted on the end of the conveyor section 39. Hardened ways 56 on the pallet rest on the driven rollers 42. The address device comprises a block 57 from the lower surface of which a plurality of address indicators in the form of keys, plungers or fingers, such as the finger 58, project selectively to engage a pneumatic pilot valve 59 residing in a socket 61 which is located under the finger. A similar socket is located under each finger and each socket is provided with a closure if a pilot valve is not present. It should be noted, furthermore, that each finger can occupy either of two spaced vertical positions. The finger 58 is provided with a laterally-extending pin 62 which is used to move it from one of these positions to the other and, of course, each of the other fingers is also provided with such a pin.

The details of the finger 58 and the pilot valve 59 are clearly shown in FIG. 8. The finger is generally cylindrical and is vertically slidable from position A to position B in a bore 63 in the block 57 of the address device. A spring-loaded ball detent 64 snaps into one or the other of the vertically-spaced grooves 65 and 66. A pin 67 extends into the bore 63 and rides in a vertical groove 68 formed in the finger to allow vertical movement without rotation. The pilot valve 59 or the closure for the socket (if the pilot valve is not present) is locked in place by means of a split pin 69. Pressure-regulated air from a suitable supply or source enters the address reader 36 through a restricted flow conduit 71 which discharges into a manifold bore 72 which, in turn, extends the entire length of the reader. When a pilot valve is engaged by a finger, it restricts the venting of air into the atmosphere and the rise in pressure in the bore 72 is sensed by pressure-sensitive devices or pressure-actuated switches 73 and suitable action is taken. It can be seen, then, that, if one wishes to cause the fixture or pallet and workpiece to enter the cross conveyor 18 for machining at the work station 27, it is only necessary to pull a finger on the address device 35 to the down or A position and to insert a pilot valve in the corresponding socket of the address reader 36. Then, the fixture or pallet will continue along the loop without being shunted into a cross conveyor until it arrives at the cross conveyor 18. At that time the finger 58 will strike the pilot 59 so that, after the fixture or pallet passes onto the turnstile, the turnstile will turn and discharge the fixture or pallet onto the cross conveyor 18. In place of pneumatic sensing of indicators just described, electrical proximity or mechanical switches or detents can be used as well as any other suitable sensing devices.

It is to be understood that the address block principle is equally applicable to so-called stable (engine block per se) and unstable parts (transmission housing with carrying fixture per se). FIG. 7A shows a block 57A with a fixture carrying an unstable part exemplified by a transmission housing. FIG. 7B shows a block 57B directly with a stable part or engine block for example. Thus the sensing devices are applicable to various production systems including but not limited to assembly and inspection operations.

Figures 9, 10, 11, 12, 13:
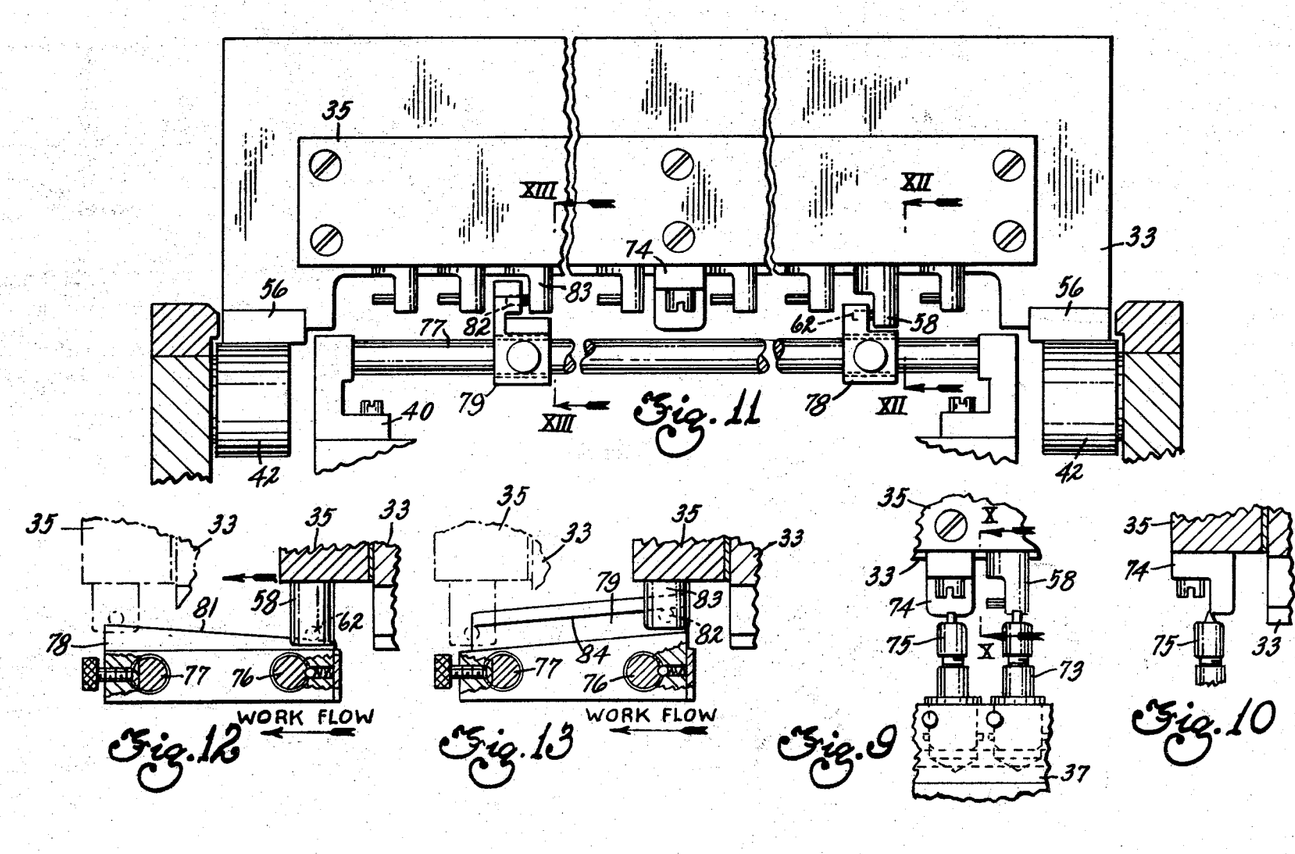

Referring to FIG. 9, the second address reader 37 associated with the work station 27 is shown in engagement with the address device 35. At his time the finger 58 has engaged another pilot valve 73 in the same position, thus identifying the pallet and workpiece as properly being present at the work station 27. At the same time a permanent dog 74 engages another pilot valve 75, which acts to disable the turntable 31 (which has already been returned 90 degrees to the original position), so that no further pallets are allowed to enter the cross conveyor 18 for a time. It will be understood that, by locating the second address reader closer to the entrance to the cross conveyor, it is possible to determine the number of pallets that are allowed to accumulate in queue at the work station before the turnstile is disabled and the other pallets are caused to pass along the loop conveyor, even though they are "addressed" to work station 27. FIG. 10 shows the detail of the dog 74 and its relation to the pilot valve 75.

FIGS. 11, 12 and 13 show the apparatus for cancelling an address and providing a new one after the operations have been performed on the workpiece at a work station. FIG. 11 shows the relationship that exists after the pallet leaves the work station 27 and arrives at the address modifier 40, the view showing the pallet progressing toward the observer. The modifier includes horizontal rods 76 and 77 on which are mounted a setting block 79 and a cancelling block 78. The cancelling block 78 has an upwardly-directed inclined surface 81 which is engaged by the pin 62 on the finger 58. As the pallet progresses in the direction of the arrow, the pin 62 slides up the inclined surface and moves the finger from the A position to the B position. Assuming that the "down" position of the finger 58 was the address that led the pallet to work station 27 in the first place, the movement of the finger 58 to the "up" position constitutes an erasure of that particular address.

Now, while the cancelling block 78 is operating on the finger 58, the setting block 79 is engaging another finger 83 having a pin 82. The block 79 is provided with a downwardly-directed inclined surface 84 which engages the pin 82 and pulls the finger 83 downwardly into the "down" position where it is locked by its spring-loaded ball detent. It will be understood that, since all of the workpieces that have been presented to work station 27 are in the same "run" of parts and are all the same, the address (finger 83 in "down" position) will be the same for every pallet that engages the modifier 40. This new address will be another work station, such as the work station 28 in the cross conveyor 19. The pallet will then move around on the loop conveyor until such time as it is permitted to enter the cross conveyor 19 to be operated on by the work station 28.

The operation of the invention will now be readily understood in view of the above description. First of all, the workpiece 32 is mounted on its pallet 33 in exact, accurate relationship to the projections on the pallet which form part of the means for connecting the pallet to the locating table 38, as has been described above. FIG. 1 also shows load and unload spurs such as C, D, E and F having turnstiles and free rolling conveyors including associated readers and key-setting means as indicated. At that time the operator sets the finger 58 at the low or A position, since the first set of operations will be performed on the machine tool at the work station 27. This setting can be done automatically by use of address setting devices noted earlier. The pallet with its workpiece is then propelled in the direction of the arrow in FIG. 1 along the connecting conveyor 12 passing then to conveyor 11 to which the discharge ends of the cross conveyors are connected. This is the upper side of the loop in FIG. 1. The pallet passes through the wash station 13 and enters the lower or entrance side of the loop conveyor. As it passes over the successive first address readers associated with the cross conveyors 14, 15, 16 and 17, there is no pilot valve associated with the socket underlying the finger 58, so that the turnstiles associated with these cross conveyors remain in alignment with the loop conveyor. The pallet passes the entrances to these cross conveyors without being deflected from the loop conveyor. Eventually, of course, the pallet arrives at the address reader 36 and the finger 58 strikes the pilot valve 59 and actuates the control switches 73. The pallet moves onto the turnstile and the turnstile turns 90 degrees to project the pallet onto the cross conveyor 18. The pallet moves along the cross conveyor and eventually reaches the second address reader 37. The finger 58 contacts the pilot valve 73, thus verifying that the workpiece is properly at that work station 27. Also, when the dog 74 strikes the pilot valve 75 to deactivate the turnstile so that no further pallets addressed to work station 27 will be shunted into the cross conveyor 18 until the pallet present at the work station is removed. A pallet that is addressed to a work station that is already occupied will pass right by the entrance to the cross conveyor and continue around the loop conveyor. In making such a circuit around the loop, the pallet uses the cross conveyor 22 to by-pass the load-and-unload station 12. The pallet will keep cruising around the loop until its address work station is free and it is permitted to enter the proper cross conveyor. It is to be understood that queues of varying length are permissible so that the final pallet in queue inhibits the turnstile.

Now, let us suppose that the series of mutually dependent machining operations that are performed at the work station 27 are very time-consuming as compared with the time required to perform other groups of operations at other work stations. In that case, the tools provided on the machine tool at work station 28 and the tape-controlled program set up in the cabinet associated with it, can be arranged to provide the same set of operations on the workpiece as the work station 27. Then, a pilot valve is inserted in the first address reader associated with the cross conveyor 19 in the same socket as the pilot valve 59 of the reader 36. Then, when a pallet addressed to the work station 27 is not permitted to enter the cross conveyor 18 (because a workpiece is being machined in the work station), it continues along to the cross conveyor 19. The first address reader there allows the pallet to enter cross conveyor 19 and receive its machining operations from the work station, assuming that no workpiece is already in the work station.

In any case, after the pallet 33 and workpiece 32 have left the work station 27, they arrive at the address modifier 40. There, the finger 58 is moved upwardly into position B by the cancelling or erasing block 78. At the same time, the finger 83 is pulled down into the lower, active position by the setting block 79. With its new "address" (say, the work station 29) the pallet leaves the cross conveyor 18 and enters the loop conveyor again and starts around the loop again. If the work station 29 is available when the pallet reaches the entrance and turnstile of the cross conveyor 21, the pallet is carried to the work station 29 for a second set of machining operations. As the pallet leaves the work station 29, it may be re-addressed to a third work station, such as the work station 24. It can be seen, then, that the geographic location of the work station in the system does not determine the order in which it is used on a workpiece; in other words, no matter where the machine tool is located in the system, it may be used at any position in a train of operations on the workpiece. Once the pallet has been addressed to a certain work station, it will continue to cruise around the loop until it reaches the proper cross conveyor and the desired machine tool is not occupied. In this connection, it will be understood that the apparatus can be arranged to deny admission to a cross conveyor when a queue of a predetermined number of pallets has accumulated in front of the work station.

In the case of many workpieces, the machining operations can be divided into groups such that the individual operations in a given group must be performed one after another and can all be performed on a single multi-tool machine. Such a group or series of operations would be the milling of a flat surface, drilling a hole in the center of the flat surface, boring the hole, reaming the hole, and threading the hole; each of these machining operations can be performed only after the preceding operation has been completed and they can be performed on a single machine tool, such as a multiple-spindle turret machine or an automatic tool changing machine. Furthermore, on many workpieces the order in which these groups of operations are performed is not important; in other words, the groups are independent, while the operations within a given group are dependent on one another. When this situation exists (as it does in most workpieces), it is possible to pull down two or more of the address fingers. The pallet will cruise around the loop until it reaches a cross conveyor containing any one of the addressed work stations. If the work station is available (that is to say, if less than the predetermined queue is present on the cross conveyor before the machine tool), then the pallet will enter the cross conveyor, receive the machining operations and re-enter the loop. It will cruise around the loop until it arrives at the next addressed cross conveyor and work station. As it leaves each work station, that particular address finger is "cancelled" by the address modifier; the address modifier will set a new address if a subsequent dependent station is required.

Another interesting aspect of the invention is the manner in which a first run of similar workpieces is finished at the same time that a run of another type of workpieces is started. For the purpose of illustration, let us assume that the first run is using the entire system and work stations 23, 24 and 25 are set up to perform the same A group of operations, work stations 26 and 27 perform another B group of operations, and the work stations 28 and 29 perform another C group of operations. Let us assume that the groups are independent, i.e., because of the inherent capabilities of the system, a particular workpiece may be machined in any order, such as B–C–A. Now, once the last pallet and workpiece of the first run has been prepared on the load-and-unload station 12 and has been discharged into the network, the operator wishes to begin work on a new run of workpieces on each of which are to be performed operation groups D, E and F. He first renders the turnstile at the entrance of a cross conveyor (say, cross conveyor 14) inoperative to present pallets to the work station 23. Then, he changes tools in the machine tool at the work station 23 and converts the tape control, so that the work station 23 is set up to perform the group D operations. At the same time, he will place the pilot valve in both the first and the second address readers associated with the cross conveyor 14 in an address position that does not duplicate the positions already in the system for the groups A, B and C. He then begins to introduce the "new" pallets and workpieces onto the loop conveyor and they begin to cruise. When they come to the cross conveyor 14, they will enter it to receive the D group of operations at the work station 23. When the queue in the cross conveyor 14 becomes larger than a predetermined size, the excess conveyor 14 becomes larger than a predetermined size, the excess new pallets will cruise around the loop until room is available. In the meanwhile, work stations 24 and 25 are finishing up the group A operations on the last of the first run; eventually, no pallets will arrive at work station 25 because almost all first run pallets have received the group of A operations and those that have not arrived at the cross conveyor 15 first are shunted to the work station 24 instead of work station 25. As soon as work station 25 has been "abandoned" in this manner by the first run of parts, it can be converted to group D operations, or possibly to group E or F operations to take care of the pallets of the new run that are being discharged from cross conveyor 14 after having received the group D operations from the work station 23. These pallets of the new run would, otherwise, simply cruise around the loop with a group E and F address, but would encounter no first address reader with a complementary group E or F pilot valve.

In the manner described above, the work stations for the old run are gradually converted to group D, E or F operations, as the tail end of the old run is gradually finished. When more than one work station performs the same group of operations, the station furthest "downstream" (to the right in FIG. 1) will drop out and be converted first. Although the above description recites the location of the work stations for the several groups of operations as being greatly arranged from the left to right, it will be understood that before long the groups of operations will be distributed in a random fashion among the various work stations. In some cases, however, a group of operations will be given to a particular work station because that work station is peculiarly adapted to perform that group, rather than because that work station happens to be available at the time that the group of operations needs to be provided for. Furthermore, the present invention contemplates that even more than two runs of parts can exist in the system at the same time. The only limitation, of course, being in the number of machine tools available.

In general, a given pallet introduced into the system will be provided with "down" fingers corresponding to the addresses of work stations which perform non-dependent or independent groups of operations. If a particular second group of operations is dependent from a first group, the cancelling or erasing and setting blocks in the cross conveyor (or conveyors) in which the first group is accomplished will cancel out or erase the finger for the first group and set another finger for the second group. This newly reset pallet may not go to the dependent group work station first, since it may have an independent or non-dependent group of operations performed on it first either because the dependent group work station is "occupied" when it arrives there or because it arrives at the independent or non-dependent group work station before it arrives at the dependent group station.

It is to be understood that cross conveyors can have multiple work stations serially or laterally on each of opposite sides for machining operations.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to be secured by Letters Patent is:

1. A manufacturing system, comprising:
   (a) a loop conveyor with a plurality of cross conveyors extending across the loop,
   (b) a turntable located at each intersection of a cross conveyor with the loop conveyor,
   (c) a work station located on each cross conveyor,
   (d) a workpiece adapted to travel along the conveyors, the workpiece having its own distinctive address means,
   (e) a first address reader located at each entrance intersection of a cross conveyor with the loop conveyor,
   (f) a second address reader located on the intermediate portion of each cross conveyor adjacent its work station,
   (g) means operated by the first address reader to cause each workpiece to either enter the cross conveyor or to continue further on the loop conveyor, and
   (h) means operated by the second address reader to cause the work station to perform a preselected operation on the workpiece.

2. A manufacturing system as recited in claim 1, wherein one of the cross conveyors is associated with a machine tool which is to perform a series of dependent operations on the workpiece, another of the cross conveyors is associated with a machine tool which is to perform a series of non-dependent operations on the workpiece, the first address reader associated with the said *one* of the cross conveyors permitting the workpiece to enter that conveyor if less than a predetermined queue of workpieces is present, the first address reader associated with the said other of the cross conveyors permitting the workpiece to enter that conveyor if less than a predetermined queue of workpieces is present, even though the workpiece has not previously been admitted to the said one of the conveyors.

3. A manufacturing system for use with a mixture of different workpieces, each of which is to have a plurality of operations performed upon it, comprising:
   (a) a plurality of machine tools capable of performing the said operations,
   (b) a conveyor associated with the machine tools for presenting the workpieces to the machine tools, and
   (c) means bringing about the movement of the workpieces from machine tool to machine tool in accordance with a certain sequence, the sequence distinguishing between a first group of operations for each of which there is a necessary preceding operation and a second group of operations each of which may be performed without a preceding operation, the sequence being operative to bring about one of the operations in the second group when a machine tool is available to do it and a machine tool is not available to perform either one of the operations in the first group or its necessary preceding operation.

4. A manufacturing system as recited in claim 1, wherein each address device comprises a horizontal bar extending across the front edge of the pallet and containing a row of vertical bores in the end of which is slidably mounted a finger that is movable and lockable in one of two vertically-spaced positions, each address reader having a bar which extends across the conveyor containing a plurality of sockets, one adapted to underlie each finger when the address device of a pallet is located over the address reader, a switch means being movable into any of the sockets and actuatable only by a finger in its low position.

5. A manufacturing system as recited in claim 1, wherein the said workpiece is unstable in nature and is mounted on a fixture which, in turn, is mounted on a conveyor pallet, and wherein the said address means is attached to the pallet.

6. A manufacturing system as recited in claim 1, wherein the said workpiece is stable in nature and is directly mounted on a conveyor pallet, and wherein the said address means is attached to the pallet.

7. A manufacturing system as recited in claim 1, wherein spur conveyors extend from the loop conveyor for the purpose of loading and unloading workpieces.

8. A manufacturing system as recited in claim 1, wherein a work station is located on each side of cross conveyor, and wherein the two such work stations are exactly opposed for operating on a workpiece simultaneously.

9. A manufacturing system as recited in claim 1, wherein two work stations are located on one side of a cross conveyor, and wherein the said two work stations both face the cross conveyor for operating on a workpiece serially.

10. A manufacturing system, comprising
 (a) a conveyor matrix including main conveyors and secondary conveyors,
 (b) a turntable located at each intersection of a main conveyor with a secondary conveyor,
 (c) work stations located on many secondary conveyors,
 (d) a workpiece adapted to travel along the conveyors, the workpiece having its own distinctive address means,
 (e) a first address reader located at the entrance intersection of a main conveyor with a secondary conveyor,
 (f) a second address reader located on the intermediate portion of those secondary conveyors having work stations,
 (g) means operated by the first address reader to cause each workpiece to either enter the secondary conveyor or to continue further on the main conveyor, and
 (h) means operated by the second address reader to cause the work station to perform a preselected operation on the workpiece.

11. A manufacturing system comprising
 (a) a loop conveyor having a plurality of cross conveyors extending across the loop,
 (b) a plurality of pallets, each adapted to carry a workpiece and to be propelled along the conveyors,
 (c) a work station located on each cross conveyor,
 (d) an address device mounted on each pallet and having at least as many distinct address indicators as there are cross conveyors,
 (e) an address reader located in the loop conveyor at each cross conveyor, and capable of registering a coincidence of an address indicator with the address of its cross conveyor,
 (f) an address reader located in the entrance portion of each cross conveyor adjacent the work station to check the address device on each pallet that approaches the work station to determine if the pallet is properly there, and
 (g) a switching means located at the entrance intersection of each cross conveyor and arranged normally to allow a pallet to continue on the loop conveyor past the cross conveyor, but in the event of a said coincidence being registered in its address reader to cause the pallet to enter its cross conveyor.

12. A manufacturing system comprising
 (a) a loop conveyor having a plurality of cross conveyors extending across the loop,
 (b) a plurality of pallets, each adapted to carry a workpiece and to be propelled along the conveyors,
 (c) a work station located on each cross conveyor,
 (d) an address device mounted on each pallet and having at least as many distinct address indicators as there are cross conveyors,
 (e) an address reader located in the loop conveyor at each cross conveyor, and capable of registering a coincidence of an address indicator with the address of its cross conveyor,
 (f) an address modifier located in the exit portion of each cross conveyor, the modifier acting on the address device of each pallet leaving the particular work station to cancel the address indicator that brought the pallet to the particular work station and to set another address indicator which will bring the pallet to another work station which is set up to perform operations on the workpiece that are dependent on the previous performance of the operations at the particular work station, and
 (g) a switching means located at the entrance intersection of each cross conveyor and arranged normally to allow a pallet to continue on the loop conveyor past the cross conveyor, but in the event of a said coincidence being registered in its address reader to cause the pallet to enter its cross conveyor.

13. A manufacturing system comprising:
 (a) a loop conveyor having a plurality of cross conveyors extending across the loop,
 (b) a plurality of pallets, each adapted to carry a workpiece and to be propelled along the conveyors,
 (c) a work station located on each cross conveyor,
 (d) an address device mounted on each pallet and having at least as many distinct address indicators as there are cross conveyors,
 (e) an address reader located in the loop conveyor at each cross conveyor, and capable of registering a coincidence of an address indicator with the address of its cross conveyor,
 (f) a reader located in the entrance portion of each cross conveyor to determine the number of pallets in a queue there at any given time and, when a predetermined number has accumulated, to control the switching means so that no more pallets enter the cross conveyor until the number of pallets in the queue has been reduced below the predetermined number and to verify redundantly identity of the workpiece, and
 (g) a switching means located at the entrance intersection of each cross conveyor and arranged normally to allow a pallet to continue on the loop conveyor past the cross conveyor, but in the event of a said coincidence being registered in its address reader to cause the pallet to enter its cross conveyor.

References Cited

UNITED STATES PATENTS

| | | | |
|---|---|---|---|
| 2,919,790 | 1/1960 | Winz et al. | 198—38 |
| 3,200,766 | 8/1965 | Gorjanc | 198—38 X |
| 3,307,720 | 3/1967 | Davis et al. | 198—19 X |
| 3,313,014 | 4/1967 | Lemelson | 29—33 |

WILLIAM S. LAWSON, Primary Examiner

J. F. COAN, Assistant Examiner

U.S. Cl. X.R.

198—38